(12) United States Patent
Lagerskiöld et al.

(10) Patent No.: US 11,603,052 B2
(45) Date of Patent: Mar. 14, 2023

(54) TRUCK BED

(71) Applicant: Metso Outotec Sweden AB, Trelleborg (SE)

(72) Inventors: Jens Lagerskiöld, Vellinge (SE); Henrik Persson, Trelleborg (SE)

(73) Assignee: Metso Outotec Sweden AB, Trelleborg (SE)

( * ) Notice: Subject to any disclaimer, the term of this patent is extended or adjusted under 35 U.S.C. 154(b) by 122 days.

(21) Appl. No.: 17/312,765

(22) PCT Filed: Dec. 11, 2019

(86) PCT No.: PCT/EP2019/084707
§ 371 (c)(1),
(2) Date: Jun. 10, 2021

(87) PCT Pub. No.: WO2020/120602
PCT Pub. Date: Jun. 18, 2020

(65) Prior Publication Data
US 2022/0055546 A1    Feb. 24, 2022

(30) Foreign Application Priority Data

Dec. 12, 2018    (SE) .................................... 1851564-3

(51) Int. Cl.
*B60R 13/01*    (2006.01)
*B62D 33/02*    (2006.01)
(52) U.S. Cl.
CPC .............. *B60R 13/01* (2013.01); *B62D 33/02* (2013.01); *B60R 2013/018* (2013.01)
(58) Field of Classification Search
CPC ......... B62D 33/02; B60P 1/286; B60R 13/01; B60R 2013/015; B60R 13/018
See application file for complete search history.

(56) References Cited

U.S. PATENT DOCUMENTS 3,480,321 A    11/1969   Brandt et al.
4,826,233 A     5/1989   Hagenbuch
(Continued)

FOREIGN PATENT DOCUMENTS

JP    H08324463    12/1996
WO    2007105038    9/2007

OTHER PUBLICATIONS

Search Report for Indian Patent Application No. 202117025263, dated Jul. 25, 2022.

(Continued)

*Primary Examiner* — Gregory A Blankenship
(74) *Attorney, Agent, or Firm* — Andrus Intellectual Property Law, LLP

(57) ABSTRACT

An on-road truck body lining for protecting an on-road truck body from wear. The on-road truck body lining includes a plurality of main lining elements and a plurality of edge lining elements. Each main lining element includes a load-facing element having one or more transition sides, each transition side being adapted to meet a corresponding transition side of an adjacent edge lining element. A reinforcement plate having a main portion is fixedly attached to the load-facing element in a stacked configuration and having one or more end portions, each of the one or more end portions protruding out from a transition side of the load-facing element to form a respective flange. In use, the one or more end portions of the reinforcement plate are each arranged to be covered by a respective adjacent edge lining element such that the respective adjacent edge lining element, upon being fixated, clamps the main lining element to the on-road truck body.

16 Claims, 8 Drawing Sheets

(56) References Cited

U.S. PATENT DOCUMENTS

| | | | | | |
|---|---|---|---|---|---|
| 5,803,531 | A | * | 9/1998 | Nielsen | B60R 13/01 105/422 |
| 6,000,741 | A | * | 12/1999 | Reynolds | B60R 13/01 296/39.2 |
| 6,007,132 | A | * | 12/1999 | Burg | B60R 13/01 296/39.1 |
| 2005/0126056 | A1 | * | 6/2005 | Kostecki | B62D 33/02 37/379 |
| 2007/0258791 | A1 | * | 11/2007 | Davies | F16B 35/065 411/397 |
| 2009/0015028 | A1 | * | 1/2009 | Zamorano Jones | B61D 17/18 296/39.1 |
| 2011/0181067 | A1 | * | 7/2011 | Dunn | B60P 1/286 296/39.2 |
| 2014/0327265 | A1 | * | 11/2014 | Burstrom | B60R 13/01 296/39.2 |
| 2014/0354004 | A1 | | 12/2014 | Burstrom et al. | |
| 2015/0061311 | A1 | * | 3/2015 | Natarajan | B60R 13/01 296/39.2 |
| 2016/0046244 | A1 | * | 2/2016 | Chewning | B60R 13/01 29/428 |
| 2020/0180522 | A1 | * | 6/2020 | Larsson | B60R 13/01 |
| 2020/0215995 | A1 | * | 7/2020 | Persson | B62D 25/2072 |
| 2021/0146855 | A1 | * | 5/2021 | Larsson | B60P 1/286 |
| 2021/0339669 | A1 | * | 11/2021 | Balzola | B60R 13/01 |
| 2021/0370850 | A1 | * | 12/2021 | Larsson | B60R 13/01 |
| 2022/0055546 | A1 | * | 2/2022 | Lagerskiöld | B60P 1/286 |

OTHER PUBLICATIONS

Search Report for Indonesian Patent Application No. HKI-3-KI.05.01.08-TA-P002021 04704, dated Aug. 16, 2022.
International Search Report and Written Opinion for International Application No. PCT/EP2019/084707 dated Mar. 5, 2020.

* cited by examiner

TRUCK BED

CROSS-REFERENCE TO RELATED APPLICATIONS

This application is the U.S. national stage application of International Application PCT/EP2019/084707, filed Dec. 11, 2019, which international application was published on Jun. 18, 2020, as International Publication WO 2020/120602 A1 in the English language. The International Application claims priority of Swedish Patent Application No. 1851564-3 filed Dec. 12, 2018.

FIELD OF THE INVENTION

The present invention relates to truck bed linings, especially on-road truck bed linings and to a method of installing a on-road truck bed lining.

BACKGROUND OF THE INVENTION

When transporting for example rock material, crushed or natural, excavated earth material or other materials using on road trucks during for example infrastructure construction work such as road or tunneling construction, the truck beds are subject to substantial wear during loading, transporting and unloading of the material. Furthermore, infrastructure projects are sometimes performed in or near densely populated areas such that noise occurring during for example loading/unloading may be perceived as bothersome and authorities may issue restrictions regarding noise levels and limitations as to at what time work may be performed. Normally, on-road truck beds are made from steel which causes high noise levels, especially during loading of material using e.g. front loaders or excavators. Further, the truck beds are subjected to excessive wear reducing lifetime of the truck bed.

SUMMARY OF THE INVENTION

An object of the invention is to overcome, or at least lessen the problems involved with prior art on-road truck beds. A particular object is to provide an on-road truck body lining for protecting an on-road truck body from wear. The on-road truck body lining comprises a plurality of main lining elements and a plurality of edge lining elements arranged to be fixated to the truck body. Each main lining element comprises a load-facing element having one or more transition sides, each transition side being adapted to meet a corresponding transition side of an adjacent edge lining element of the plurality of edge lining elements and a reinforcement plate having a main portion being fixedly attached to the load-facing element in a stacked configuration. The reinforcement plate has one or more end portions, each of the one or more end portions protruding out from a respective transition side of the load-facing element so as to form a respective flange, such that, in use of the truck body lining, the one or more end portions of the reinforcement plate are each arranged to be covered by a respective adjacent edge lining element such that the respective adjacent edge lining element, upon being fixated, clamps the main lining element to the truck body. The use of lining for an on-road truck bed greatly reduces the noise and vibrations during e.g. loading of the truck and it also reduces the amount of carry-back, i.e. the amount of material sticking to the truck bed after unloading. By using the edge lining elements to clamp the main lining elements to the truck bed, it is possible to reduce the number of holes that need to be drilled in the truck bed to mount the lining by means of e.g. bolts or similar.

In accordance with an embodiment of the on-road truck body lining, the edge lining elements are arranged to extend over and be fixated to the on-road truck body at edge portions thereof.

In accordance with an embodiment of the on-road truck body lining, edge lining element forms a lining transition between non-parallel main lining elements of said plurality of main lining elements. Edge portions of the truck bed, such as the transition between side wall and bottom wall, are suitable for arranging the edge lining elements since the edge lining element can be designed to cover the transition between e.g. a horizontal bottom wall and a vertical side wall.

In accordance with an embodiment of the on-road truck body lining, the plurality of main lining elements comprises a plurality of side lining elements arranged to extend over side surfaces of the on-road truck body. The load-facing element of each side lining element has one transition side and each side lining element comprises a plurality of mounting holes for mounting the side lining element to the truck body, the plurality of mounting holes being arranged distally to the transition side. This solution has the advantage that only the side being distal to the transition side requires mounting holes, therefore mounting holes in the truck bed are also only required at a corresponding location, whereas the transition side of the side lining element is clamped to the truck bed by the edge lining element.

In accordance with an embodiment of the truck body lining, the plurality of main lining elements comprises a plurality of bottom lining elements arranged to extend over bottom surfaces of the truck body. The load-facing element of each bottom lining element has two transition sides arranged opposed to each other and the reinforcement plate of the bottom lining element has two end portions, each of the two end portions protruding out from a respective transition side of the load-facing element so as to form a respective flange. This allows for the bottom lining elements to be clamped to the truck bed along both end portions, hence no mounting holes at all are required for the bottom lining elements, neither in the bottom lining elements themselves, nor in the bottom part of the truck bed.

In accordance with an embodiment of the truck body lining, the plurality of main lining elements comprises at least one front lining element arranged to extend over a front surface of the truck body, wherein the load-facing element of said at least one front lining element has one transition side and wherein the at least one front lining element comprises a plurality of mounting holes for mounting the front lining element to the truck body, said plurality of mounting holes being arranged distally to the transition side. Similar to the side lining elements, the front lining element of the present invention reduces the number of mounting holes required in the front lining element as such as well as in the truck bed.

In accordance with an embodiment of the truck body lining, the one or more end portions of the reinforcement plate forms oblique angles with the first portion of the reinforcement plate. This allows for the end portions to make the transition from e.g. a horizontal bottom of the truck bed to a vertical side wall or front wall of the truck bed. Often, this transition is achieved by means of an oblique transition edge in the truck bed, for example along an edge which is inclined at approximately 45 degrees to both the side wall and the bottom wall of the truck bed. Such transition edges are provided to reduce so called carry-back, i.e. the amount of material that sticks to the truck bed also after unloading. It is of big importance to reduce the amount of carry-back since it can greatly reduce the transportation capacity of an on-road truck and it has been found that avoiding straight angles between side and bottom walls is one way of achieving this. It should be noted that an inclination of 45 degrees is merely an example and the inclination may vary considerably between different truck beds and may vary depending on the intended material to be transported.

In accordance with an embodiment of the truck body lining, the first portion of the reinforcement plate has one or more weight-reducing cut-out openings. Keeping weight down is important since it will allow an on-road truck to carry more load and since assembly of the lining will be facilitated by reduced weight.

In accordance with an embodiment of the truck body lining, each main lining element has at least one connection side adapted to meet a corresponding connection side of an adjacent main lining element and a connection side forms an oblique angle with a load-facing front surface of the main lining element such that a main lining element partially extends over an adjacent main lining element located rearward thereof. This has the advantage that during unloading of the truck bed, where the transported material slides over the surface of the lining elements, it can be avoided, or at least to a great extent reduced, that the material will hook into the connection side facing forwardly. The current solution creates an obtuse angle between the load-facing front surface of the main lining element and the upstream, or forward, connection side of the same main lining element. Correspondingly, the present invention will create a pointy angle between the load-facing front surface of the main lining element and the downstream, or rearward, connection side of the same main lining element. If perpendicular angles are chosen, the risk is greater that material sliding over the surface during e.g. unloading will hook into and pry open the joint between adjacent lining elements.

In accordance with an embodiment of the truck body lining, each edge lining element comprises a plurality of mounting holes for mounting the edge lining element to the truck body. By arranging the mounting holes in the edge lining elements, the number of mounting holes that need to be drilled into the truck bed can be greatly reduced.

In accordance with an embodiment of the truck body lining, the load-facing elements of at least a sub-set of the plurality of main lining elements comprises one or more recesses arranged on a back side of the load-facing element facing the truck body, so as to provide a cavity between the truck body and the main lining element. This solution has the advantage that the material of the main lining elements will deflect into the cavity when loaded with material to be transported. Then, during unloading of the material, the main lining elements will snap back, again creating a cavity at the rear side. This has the great advantage that any carry-back built up on the lining element will loosen when the element snaps back and can be unloaded together with the rest of the material.

In accordance with an embodiment of the truck body lining, at least a sub-set of the plurality of edge lining elements comprises one or more recesses arranged on a back side thereof facing the truck body, so as to provide a cavity between the truck body and the edge lining element. Similar to the main lining elements, this will greatly reduce the amount of carry-back sticking to the truck bed along the edge areas.

In accordance with an embodiment of the truck body lining, stop plates are attached to the truck body such that said stop body protects a rear connection side of a rearmost main lining element and/or edge lining element. It is advantageous to protect the short side of the rearmost lining elements. Often, on-road trucks are provided with cover doors at the rear end of the truck bed to increase load capacity. If rock material or similar is left between the cover door and rearmost lining elements, the lining elements will otherwise be damaged as the door is closed.

In accordance with a second aspect of the invention, a method for installing an on-road truck body lining is provided. The method comprises the steps of positioning a plurality of bottom lining elements on the bottom surface of the on-road truck body; positioning a plurality of side lining elements on the side surfaces of the on-road truck body, mounting said plurality of side lining elements to the on-road truck body using mounting holes, and; positioning a plurality of edge lining elements along edge portions of the on-road truck body such that the plurality of edge lining elements cover one or more end portions of a reinforcement plate of a side lining plate and a bottom lining plate. The plurality of edge lining elements are mounted to the on-road truck body, such that the plurality of edge lining elements clamps the plurality of side lining elements and the plurality of bottom lining elements to the on-road truck body. This has the advantage in comparison with unlined truck beds that noise and vibrations during e.g. loading is greatly reduced. Further, thanks to the use of edge lining elements clamping the side lining elements and bottom lining elements to the on-road truck body, the number of mounting holes in lining elements and truck body can be greatly reduced. It should be noted that the order in which the bottom lining elements and the side lining elements are positioned on the truck body is irrelevant. Important is that they are positioned prior to the edge lining elements which will clamp the bottom lining elements and the side lining elements to the truck body.

In accordance with an embodiment of the method, a stop plate is attached at or near a rear end of the on-road truck body such that a rear connection side of a rearmost main lining element and/or edge lining element is protected from wear.

In accordance with a third aspect of the invention, an on-road truck body having an on-road truck body lining in accordance with any of the embodiments of the on-road truck body lining described herein or an on-road truck body having an on-road truck body lining installed in accordance with any of the methods described herein is provided.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other additives, components, integers or steps.

BRIEF DESCRIPTION OF THE DRAWINGS

The invention will be described in more detail and with reference to the appended drawings in which.

DESCRIPTION OF EMBODIMENTS

Figure 1:
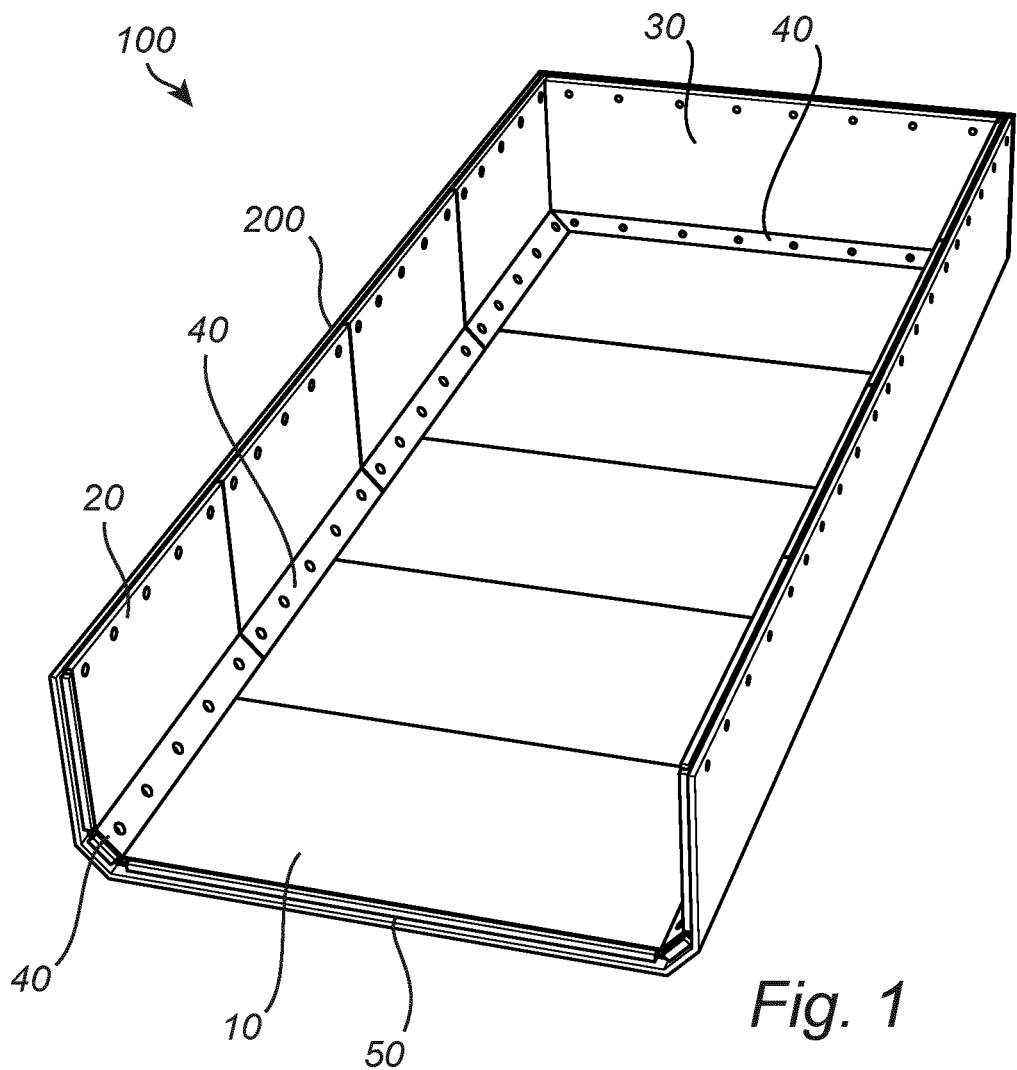
FIG. 1 shows a schematic perspective view of a truck body having a truck body lining in accordance with an embodiment of the invention.

The present invention will now be described more fully hereinafter with reference to the accompanying drawings, in which exemplifying embodiments of the invention are shown. The present invention may, however, be embodied in many different forms and should not be construed as limited to the embodiments set forth herein; rather, these embodiments are provided for thoroughness and completeness, and to fully convey the scope of the invention to the skilled addressee. Like reference characters refer to like elements throughout.

FIG. 1 shows a schematic perspective view of a truck body 100 comprising a lining arrangement 200 covering a major part of the load carrying surfaces of the truck body 100. The lining arrangement 200 comprises among other things a plurality of side lining elements 20, a plurality of bottom lining elements 10, at least one front lining element 30, a plurality of edge lining elements 40 and at least one stop plate 50. The different parts of the truck body lining will now be discussed in more detail referring to FIGS. 1 through 5g.

Figure 2A:
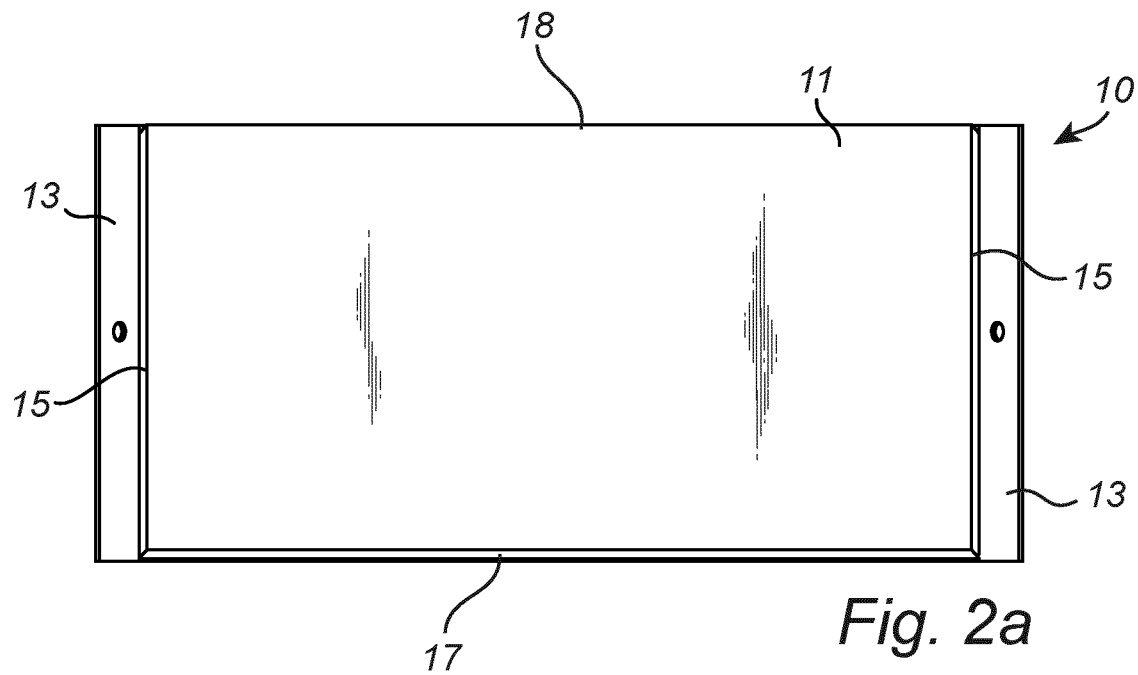
FIGS. 2a to 2c show schematic views of a bottom lining element in accordance with an embodiment of the invention.
Figure 2B:
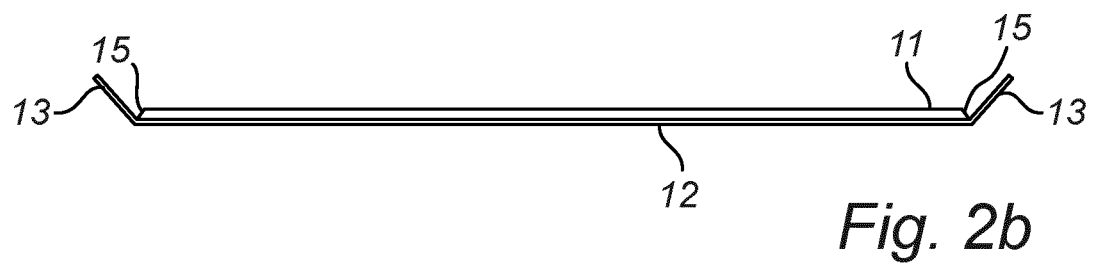
Figure 2C:
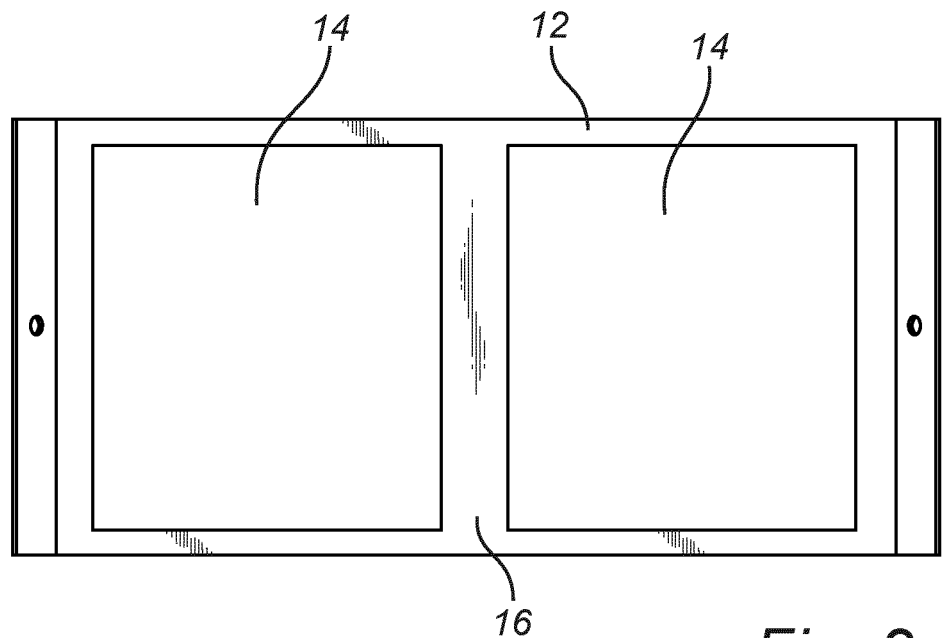

As can be seen in FIGS. 2a-2c, the bottom lining elements 10 comprises a load-facing element 11 and a reinforcing plate 12 made from e.g. metal arranged on a backside thereof. The backside here being defined as the surface facing the truck body and away from the load. The load facing element 11 can be made from rubber, polyurethane or other suitable polymer or other suitable material. The load facing element 11 has two transition sides 15, each transition side 15 being adapted to meet and fit with a corresponding transition side 45 of an adjacent edge lining element 40. The reinforcement plate 12 has a main portion 16 being fixedly attached to the load-facing element 11 and it also has two end portions 13 protruding in a flange-like manner from the load facing element 11 and being slightly inclined. This is done so that the end portions will fit to the surface of the truck body at an inclined edge portion thereof. Further, in order to reduce weight of the bottom lining element, the reinforcement plate 12 has openings 14 therein. The reinforcement plate 12 will have sufficient rigidity also with these openings. The size of the openings obviously varies with the size of the lining element and also intended use and may be decided upon by a case by case approach. As a general number the total area of the openings shall comprise at least 40% of the main surface of the load facing element 11. In accordance with one embodiment of the invention, the total area of the openings shall comprise at least 50% of the main surface of the load facing element 11. In accordance with other embodiments of the invention, the total area of the openings shall comprise at least 55, 60 and 70% of the main surface of the load facing element 11. The reinforcement plates 12 are pre-attached to the load facing element by any suitable means, such as vulcanization, gluing bolting etc. Further, the bottom lining element 10 comprises a down stream connection side 17 and an upstream connection side 18. These connections sides 17, 18 are arranged to meet and fit with an adjacent connection side 17, 18 of an adjacent bottom lining element.

Figure 3A:
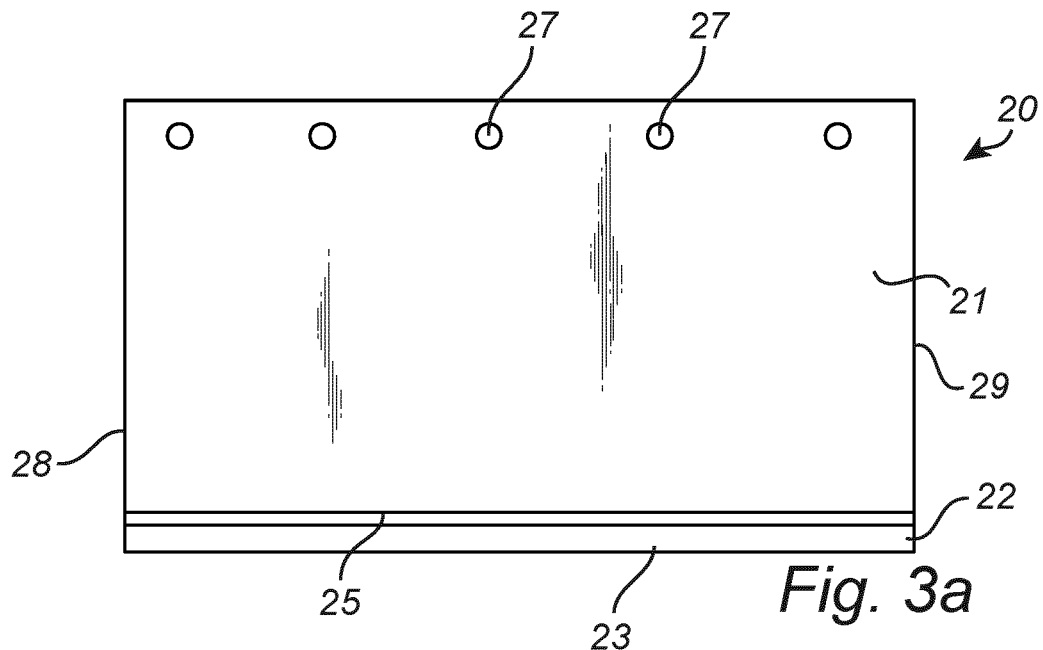
FIGS. 3a and 3b show schematic views of a side lining element in accordance with an embodiment of the invention.
Figure 3B:
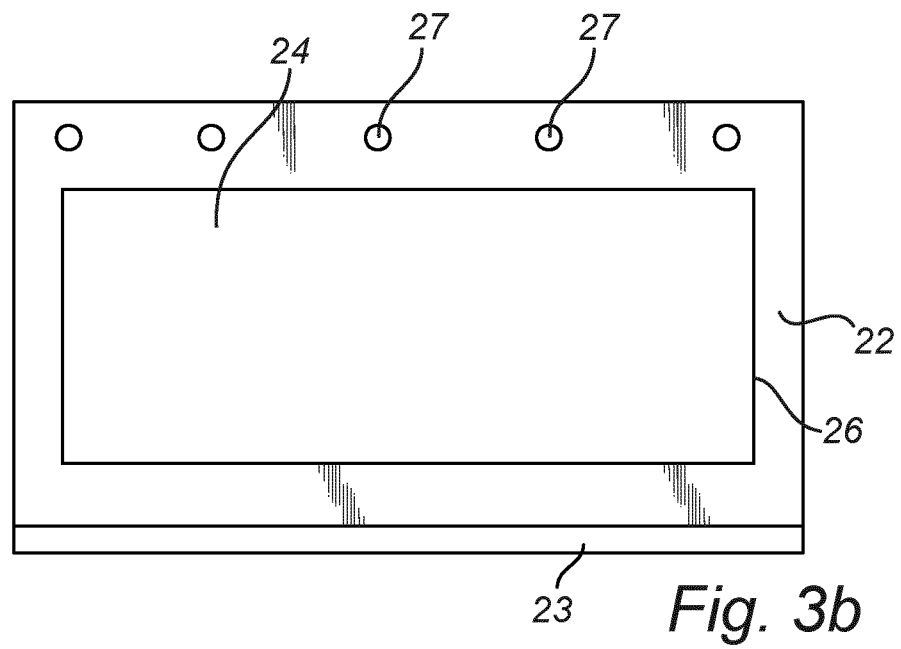

Similarly, the side lining elements, as can be seen in FIGS. 3a and 3b, comprises a load facing element 21 and a metal reinforcement plate 22 attached to a backside of the load facing element 21 by any suitable means. The side lining element also comprises a transition side 25 adapted to meet and fit with a corresponding transition side 45 of an adjacent edge lining element 40. The load facing element 21 can be made from rubber, polyurethane or other suitable polymer or other suitable material. The reinforcement plate 22 comprises a main portion 26 being attached to the backside of the load facing element and a flange-like end portion 23 which in this case is slightly inclined to fit to the surface of the truck body at an inclined edge portion thereof. The reinforcement plate 12 also has a weight reducing opening 24 being sized in a manner corresponding to those of the bottom reinforcement plate 11. The side lining element 20 further comprises a number of mounting holes 27 arranged along an upper edge thereof for bolting the side lining element to a truck body. Further, the side lining element 20 comprises an down stream connection side 28 and an upstream connection side 29. These connections sides 28, 29 are arranged to meet and fit with an adjacent connection side 28, 29 of an adjacent side lining element.

At least one front lining element 30 is also provided. This front lining element 30 will have substantially the same properties as the side lining elements.

A plurality of edge lining elements 40 are also provided. These edge lining elements 40 can be best seen in FIG. 5e. They are also made from rubber, polyurethane or other suitable polymer or other suitable lining material. The edge lining elements 40 comprises transition sides 45, substantially extending along the long sides thereof. These transition sides 45 are adapted to meet and fit with the transition sides 15, 25, 35 of the bottom lining elements 10, side lining elements 20 and front lining elements 30, as the case may be. The transition sides 45 may have an inclination as required by the shape of the main lining elements and the inclination of the edge portion. The edge lining elements 40 further comprises one or more mounting holes for attachment thereof to the truck body by means of e.g. bolts or rivet nuts.

Figure 4:
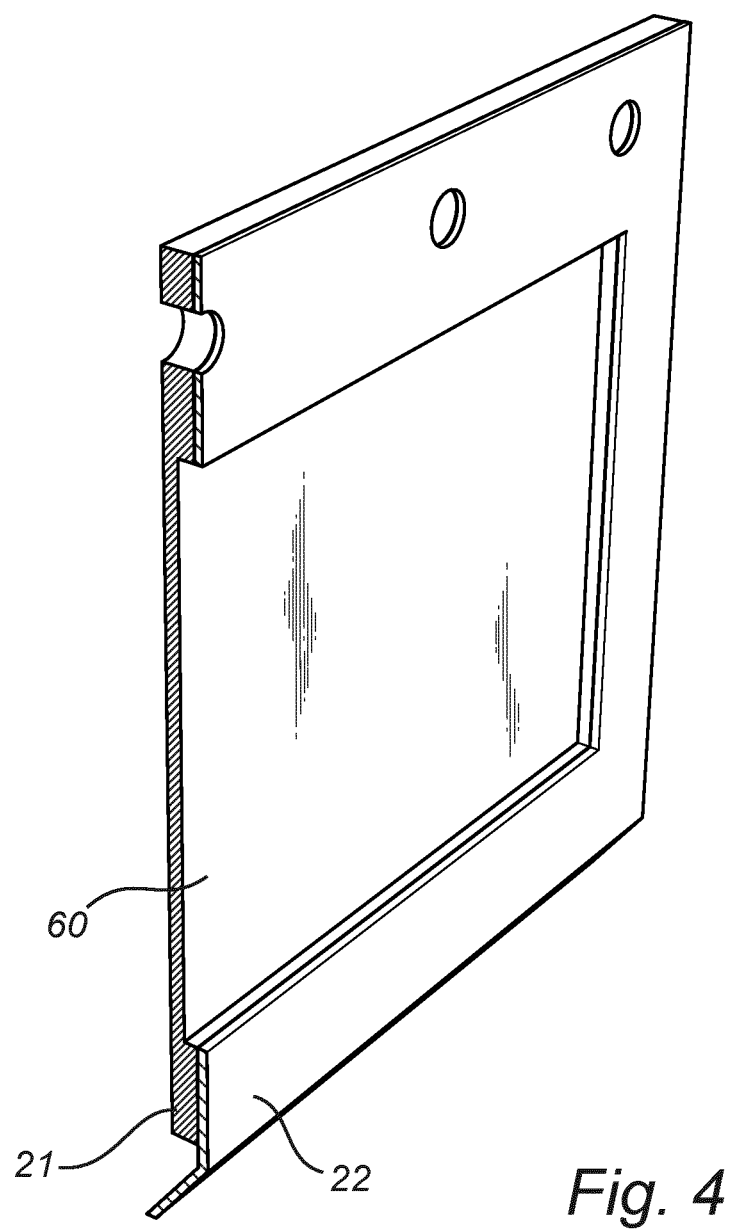
FIG. 4 show a schematic cross section of a lining element in accordance with an embodiment of the invention.

FIG. 4 discloses a preferred embodiment of the present invention. Even though indicated in FIG. 4 in the form of a side lining element 20, the embodiment may be provided on all load facing elements 11, 21, 31, 41 of all lining elements 10, 20, 30, 40. The load facing element 21 may comprise a recess 60 on the back side thereof. This recess 60 creates a cavity between the load facing element 21 and the outer surface of the on-road truck body. When the truck is loaded with material to be transported, such as gravel or similar, the material of the load facing element will deflect into the recess 60. Then, as the material is unloaded, the material of the load facing element 21 will spring or snap back again and resume its original shape. This will cause any material build-up to loosen from the side lining element, thus avoiding the problem of carry-back. This is a problem which greatly reduces the total transportation capacity.

Figure 5A:
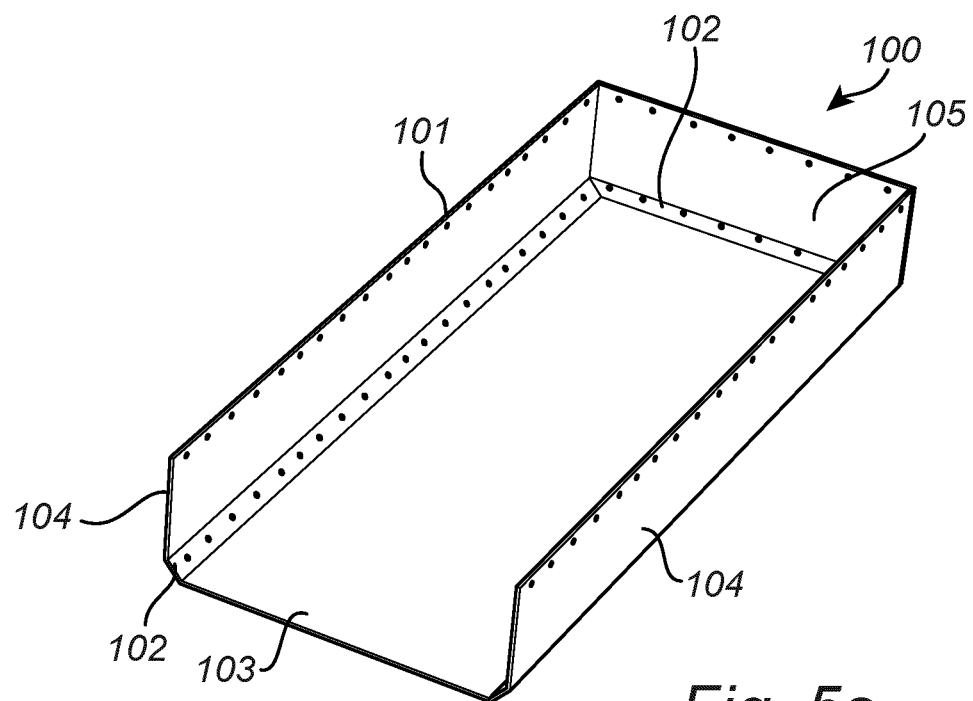
FIGS. 5a to 5g show different mounting stages of a truck body lining to a truck body in accordance with an embodiment of the invention.
Figure 5B:
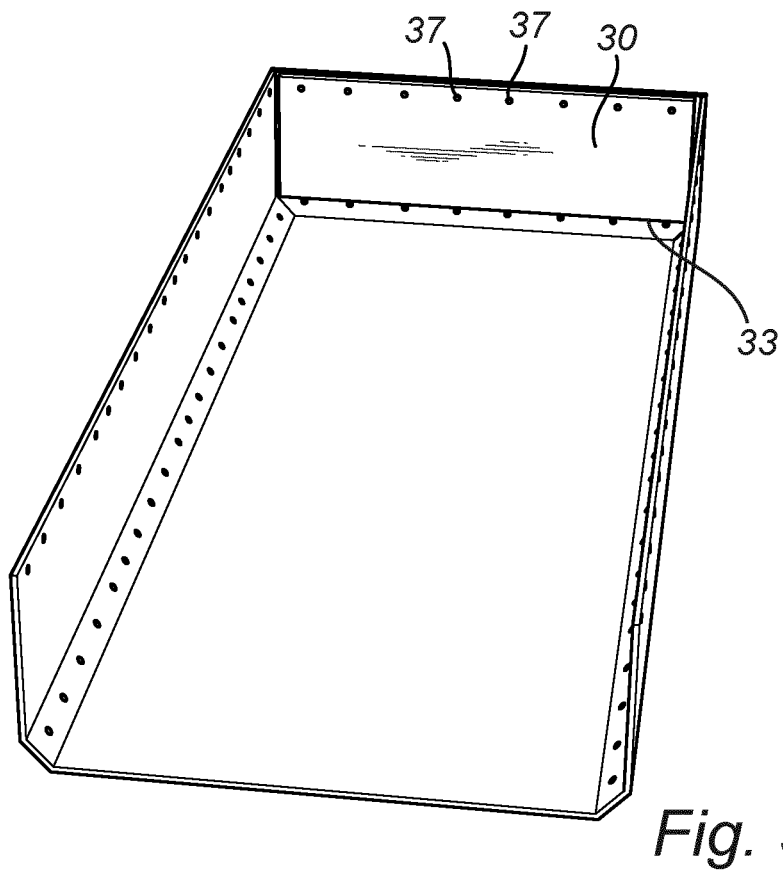
Figure 5C:
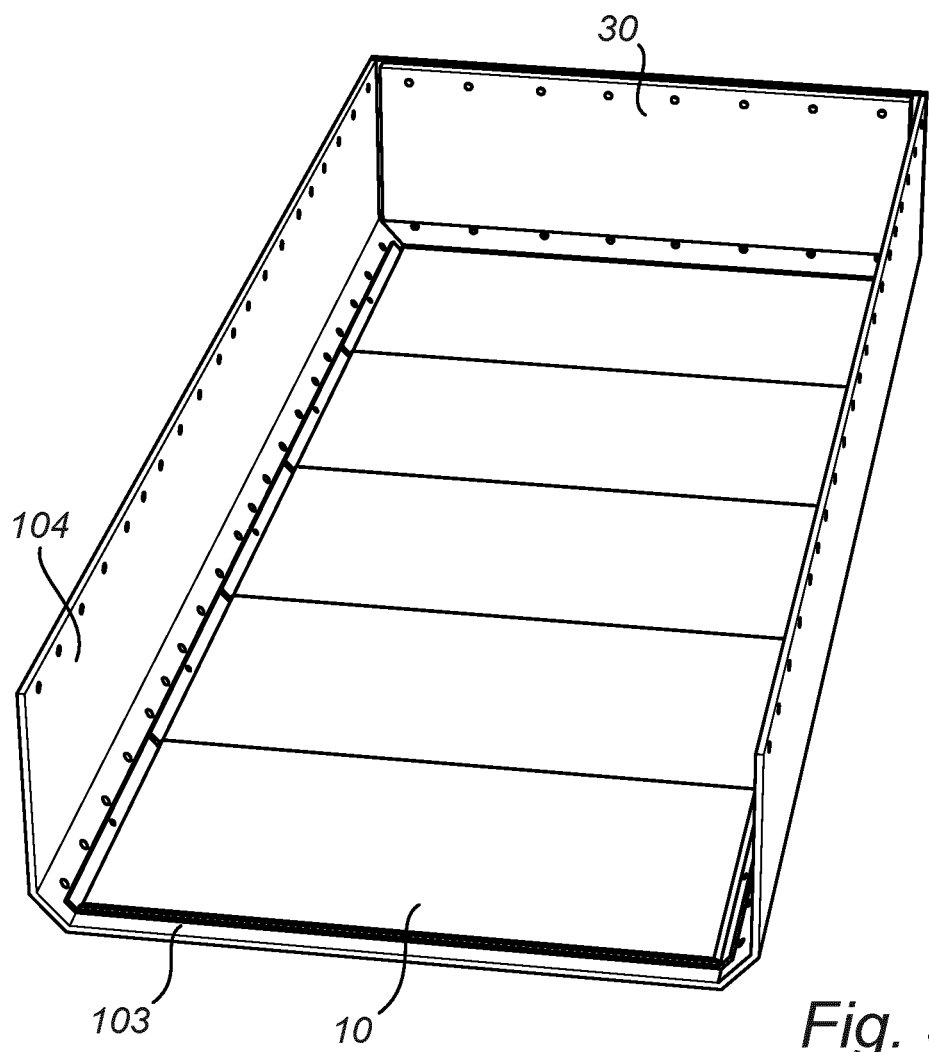
Figure 5D:
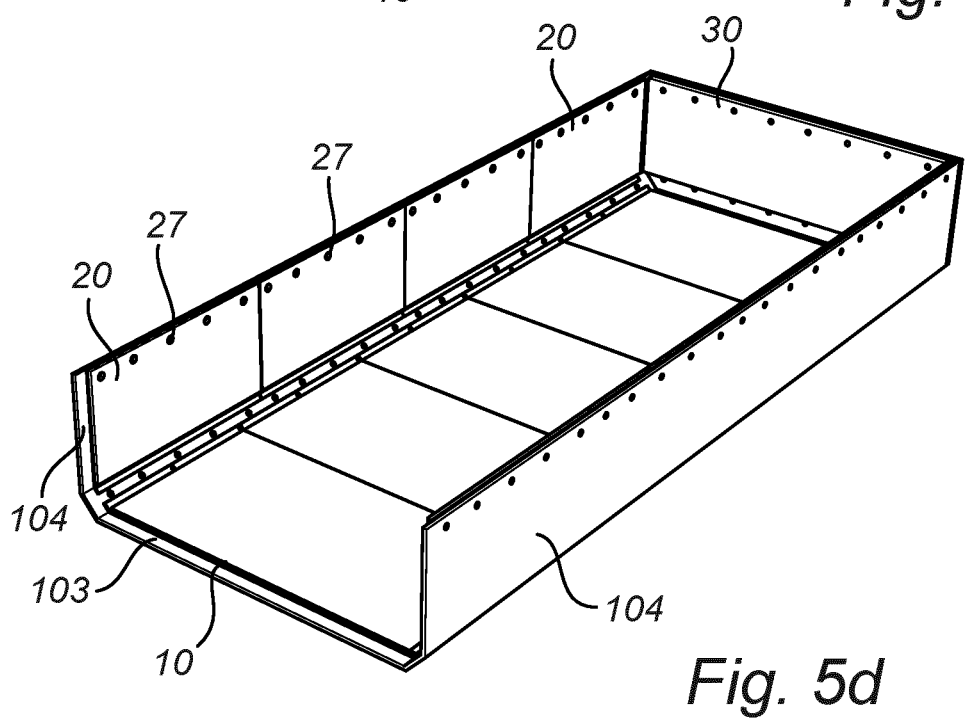
Figure 5E:
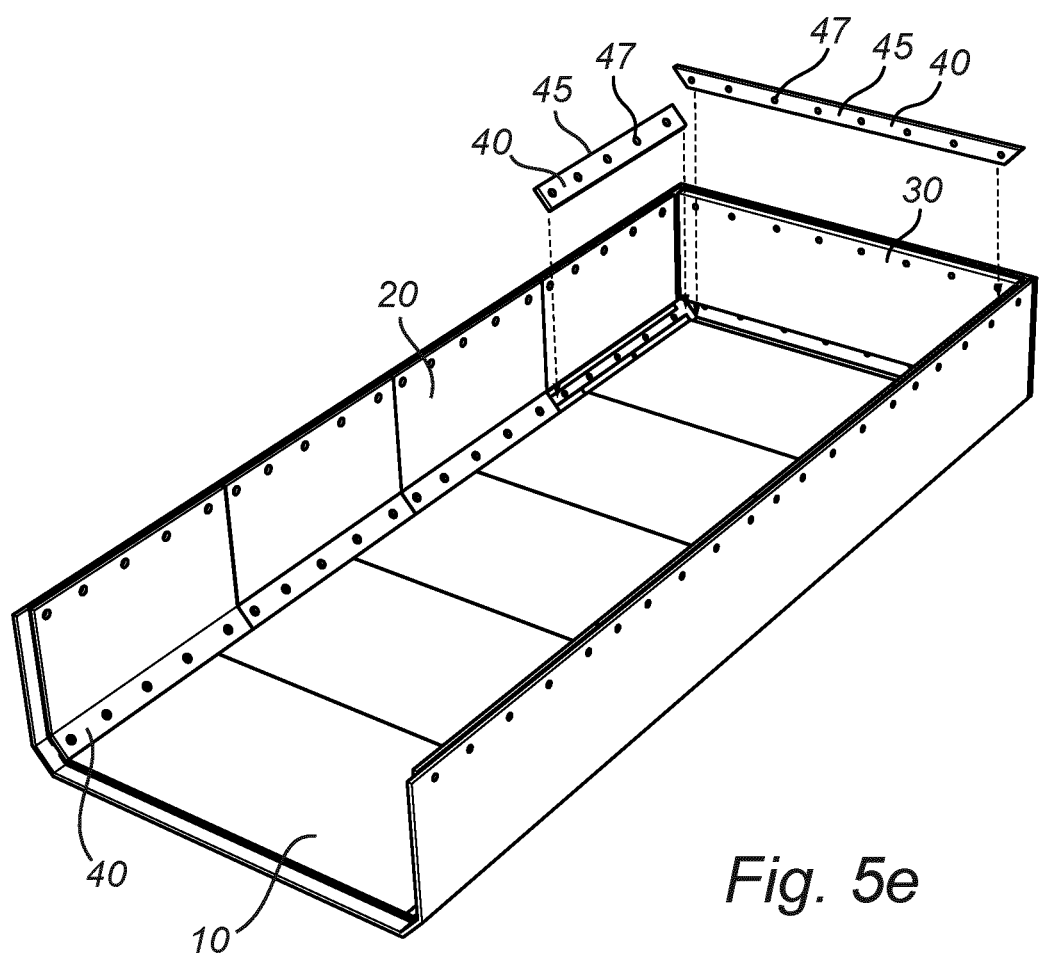
Figure 5F:
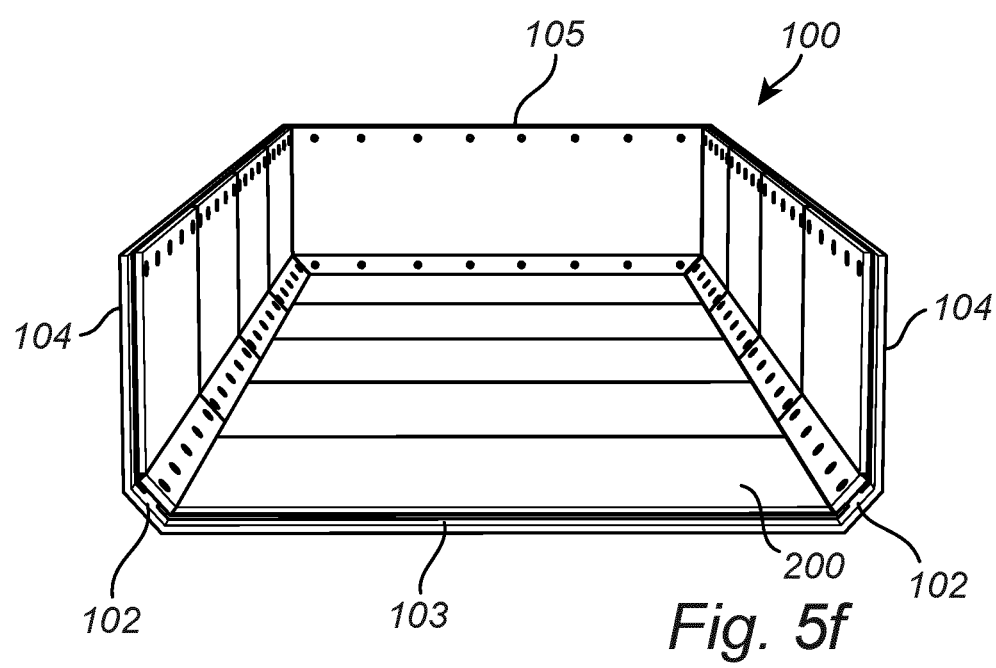
Figure 5G:
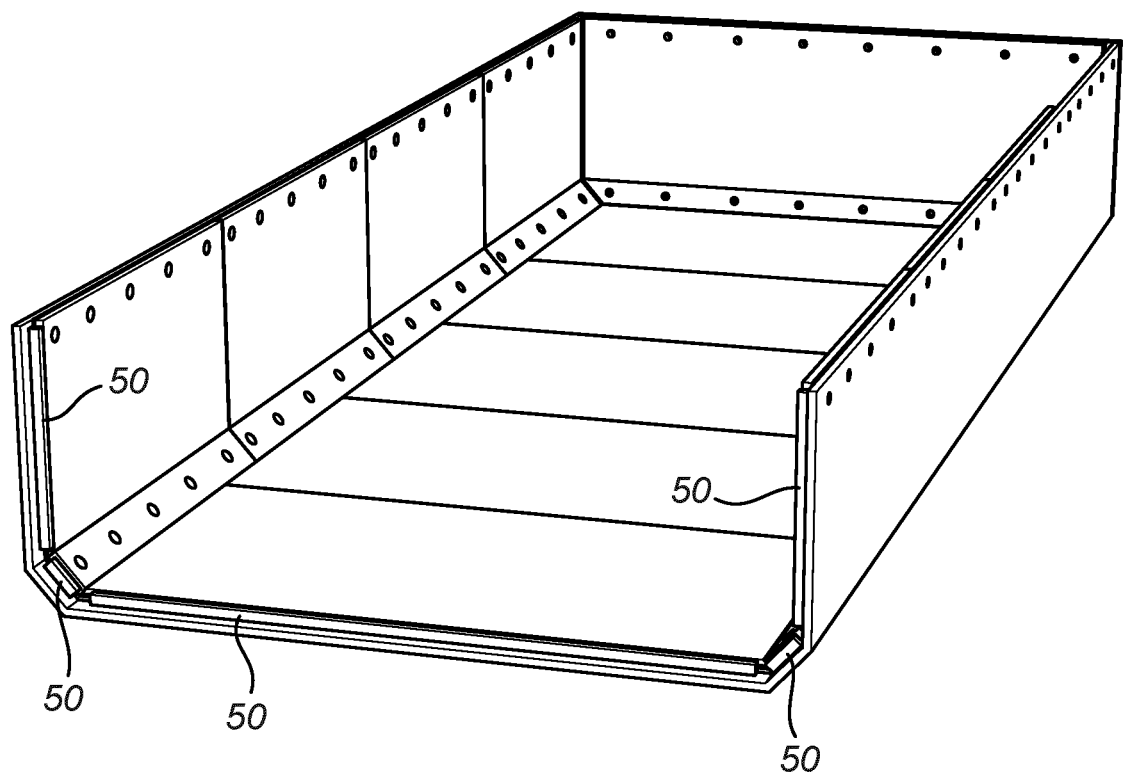
Figure 6:
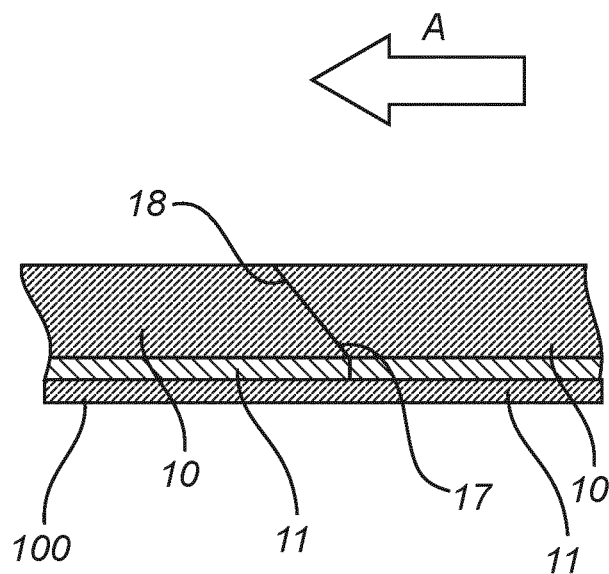
FIG. 6 shows a detail of an embodiment of the invention.

A suggested way of mounting the on-road truck body lining of the present invention will now be described in relation to FIGS. 5a through 5g. First, as seen in FIG. 5a, mounting holes are drilled in the truck body. Holes are preferably drilled along an upper edge 101 of the truck body 100 as well as along an edge portion 102 extending along a transition between bottom wall 103 and side walls 104 as well as between bottom wall 103 and front wall 105. Typically, this edge portion 102 is inclined towards the side walls 104, front wall 105 and bottom wall 103. The immediate transitions from bottom wall to edge portion, from side wall to edge portion and front wall to edge portion are provided in a smooth manner having a suitable radius. Any sharp edges will increase the risk of material build up and should be avoided. Then, as seen in FIG. 5b, the front lining element 30 is attached to the truck body 100 by means of e.g. bolts extending through mounting holes 37 along an upper edge of the front lining element and corresponding holes in the truck body 100. No bolts are provided along the side edges or lower edge of the front lining element 30. Next, as can be seen in FIG. 5c, the bottom lining elements 20 are arranged on the bottom wall 103 of the truck body 100. It should be noted that no drilling in the bottom wall 103 is required with the present invention and hence, no bolting of the bottom lining elements 20 is required. A preferred embodiment of the bottom lining elements 20 can be seen in FIG. 6. An upstream bottom lining element 20 will be shaped at a pointy angle between its downstream connection side 17 and load facing surface whereas a downstream bottom lining element 20 will be shaped at an obtuse angle between its upstream connection side and load facing surface. The will create an overlap of the upstream bottom lining element over the downstream bottom lining element. This has the advantage that as material slide over the load facing surface of the bottom lining elements during unloading, generally in the direction of the arrow A in FIG. 6, it is avoided that material pry the joint between two adjacent bottom lining elements 20 open. That would escalate wear of the lining elements and would also create material build-up and increase carry-back issues. Even though this overlapping solution has been described with respect to bottom lining elements, the same solution can be applied to other lining elements of the invention, e.g. adjacent side lining elements and adjacent edge lining elements. When the bottom lining elements 10 have been arranged, side lining elements 20 are arranged along the side walls 104 of the truck body 100. These are attached with e.g. bolts using mounting holes 27 arranged along an upper edge of the side lining elements 20 and corresponding mounting holes in the truck body 100, see FIG. 5d. When this has been done, edge lining elements 40 are arranged bridging over between bottom lining elements 10 and side lining elements 20 as well as between bottom lining elements 10 and front lining element 30. The bottom lining elements 10, the side lining elements 20 and the front lining element 30 all comprise flange-like end portions 13, 23, 33 which extend into edge portion 102 of the truck body 100. As the edge lining elements 40 are arranged and mounted by means of e.g. bolts to the edge portion 102, the bottom lining elements 10, the side lining elements 20 and the front lining element 30 will all be clamped to the truck body 100. This solution has a great advantage in that it does not require drilling of individual mounting holes in the truck body for the parts of bottom lining elements 10, the side lining elements 20 and the front lining element 30 extending into the edge portion 102. Instead, it is sufficient to drill one set of holes for the edge lining elements 40 only. The finished lining can be seen in FIG. 5f, where the single line of drill holes in the edge portion 102 can be seen. FIG. 5g discloses a preferred embodiment of the present invention. Here, stop plates 50 can be seen. These are preferably arranged along a down stream connection side of the rearmost side-, bottom- and edge lining elements. They are advantageous in that they protect the lining elements from being damaged when a cover door of the truck body 100 is closed and there is still material left which will otherwise be pressed towards the lining elements 10, 20, 40, thus increasing wear.

The skilled person realizes that a number of modifications of the embodiments described herein are possible without departing from the scope of the invention, which is defined in the appended claims. For example, the number and size of individual lining elements; the number of mounting holes; the size of openings in reinforcement plates; and thickness of load facing elements indicated in the drawings are only intended as examples and are in no way limiting. Further, and as mentioned earlier, the order in which the main lining elements are positioned on the truck bed is irrelevant. Important is that bottom, side and front lining elements are positioned prior to the positioning and fastening of the edge lining elements. This since the latter will clamp the main lining elements to the truck bed. Further, the term on-road truck has been used throughout the application. Other terms are used in the field, such as road truck, infrastructure truck, lorry etc. and these are covered by the invention as well.

The invention claimed is:

1. An on-road truck body lining for protecting an on-road truck body from wear, said on-road truck body lining comprising:
   a plurality of main lining elements, and
   a plurality of edge lining elements arranged to be fixated to the on-road truck body, each main lining element comprising:
   a load-facing element having one or more transition sides, each transition side being adapted to meet a corresponding transition side of an adjacent edge lining element of the plurality of edge lining elements, and
   a reinforcement plate having a main portion being fixedly attached to the load-facing element in a stacked configuration, and one or more end portions, each of the one or more end portions protruding out from a respective transition side of the load-facing element so as to form a respective flange, such that, in use of the on-road truck body lining, the one or more end portions of the reinforcement plate are each arranged to be covered by a respective adjacent edge lining element such that said respective adjacent edge lining element, upon being fixated, clamps the main lining element to the on-road truck body.

2. The on-road truck body lining according to claim 1, wherein the edge lining elements are arranged to extend over and be fixated to the on-road truck body at edge portions thereof.

3. The on-road truck body lining according to claim 1, wherein the edge lining element forms a lining transition between non-parallel main lining elements of said plurality of main lining elements.

4. The on-road truck body lining according to claim 1, wherein the plurality of main lining elements comprises a plurality of side lining elements arranged to extend over side surfaces of the on-road truck body, wherein the load-facing element of each side lining element has one transition side and wherein each side lining element comprises a plurality of mounting holes for mounting the side lining element to the on-road truck body, said plurality of mounting holes being arranged distally to the transition side.

5. The on-road truck body lining according to claim 1, wherein the plurality of main lining elements further comprises a plurality of bottom lining elements arranged to extend over bottom surfaces of the on-road truck body, wherein the load-facing element of each bottom lining element has two transition sides arranged opposed to each other, the reinforcement plate of the bottom lining element having two end portions, each of the two end portions protruding out from a respective transition side of the load-facing element so as to form a respective flange.

6. The on-road truck body lining according to claim 1, wherein the plurality of main lining elements comprises at least one front lining element arranged to extend over a front surface of the on-road truck body, wherein the load-facing element of said at least one front lining element has one transition side and wherein the at least one front lining element comprises a plurality of mounting holes for mounting the front lining element to the on-road truck body, said plurality of mounting holes being arranged distally to the transition side.

7. The on-road truck body lining according to claim 1, wherein the one or more end portions of the reinforcement plate forms oblique angles with a first portion of the reinforcement plate.

8. The on-road truck body lining according to claim 1, wherein a first portion of the reinforcement plate has one or more weight-reducing cut-out openings.

9. The on-road truck body lining according to claim 1, wherein each main lining element has at least one connection side adapted to meet a corresponding connection side of an adjacent main lining element, and wherein a connection side forms an oblique angle with a load-facing front surface of the main lining element such that each main lining element partially extends over an adjacent main lining element located rearward thereof.

10. The on-road truck body lining according to claim 1, wherein each edge lining element comprises a plurality of mounting holes for mounting the edge lining element to the on-road truck body.

11. The on-road truck body lining according to claim 1, wherein the load-facing elements of at least a sub-set of the plurality of main lining elements comprises one or more recesses arranged on a back side of the load-facing element facing the on-road truck body, so as to provide a cavity between the on-road truck body and the main lining element.

12. The on-road truck body lining according to claim 1, wherein at least a sub-set of the plurality of edge lining elements comprises one or more recesses arranged on a back side thereof facing the on-road truck body, so as to provide a cavity between the on-road truck body and the edge lining element.

13. The on-road truck body lining according to claim 1, wherein stop plates are attached to the on-road truck body such that said stop body protects a rear connection side of a rearmost main lining element and/or edge lining element.

14. An on-road truck body comprising an on-road truck body lining in accordance with claim 1.

15. A method for installing an on-road truck body lining, the method comprising:
    positioning a plurality of bottom lining elements on a bottom surface of the on-road truck body,
    positioning a plurality of side lining elements on side surfaces of the on-road truck body, mounting said plurality of side lining elements to the on-road truck body using mounting holes,
    positioning a plurality of edge lining elements along edge portions of the on-road truck body such that the plurality of edge lining elements cover one or more end portions of a reinforcement plate of each side lining plate and each bottom lining plate, and mounting said plurality of edge lining elements to the on-road truck body, such that the plurality of edge lining elements clamps the plurality of side lining elements and the plurality of bottom lining elements to the on-road truck body.

16. The method according to claim 15, wherein a stop plate is attached at or near a rear end of the on-road truck body such that a rear connection side of a rearmost main lining element and/or edge lining element is protected from wear.

* * * * *